US011057243B2

(12) United States Patent
Bickhart et al.

(10) Patent No.: US 11,057,243 B2
(45) Date of Patent: *Jul. 6, 2021

(54) ALIASING BEHAVIOR FOR TRAFFIC TO MULTIHOMED SITES IN ETHERNET VIRTUAL PRIVATE NETWORK (EVPN) NETWORKS

(71) Applicant: Juniper Networks, Inc., Sunnyvale, CA (US)

(72) Inventors: Ryan Bickhart, San Francisco, CA (US); Wen Lin, Andover, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,295

(22) Filed: Mar. 7, 2020

(65) Prior Publication Data

US 2020/0213155 A1  Jul. 2, 2020

Related U.S. Application Data

(63) Continuation of application No. 15/942,177, filed on Mar. 30, 2018, now Pat. No. 10,630,509.

(51) Int. Cl.
*H04L 29/06* (2006.01)
*H04L 12/46* (2006.01)
(Continued)

(52) U.S. Cl.
CPC ...... *H04L 12/4658* (2013.01); *H04L 12/4633* (2013.01); *H04L 12/4641* (2013.01);
(Continued)

(58) Field of Classification Search
CPC .. H04L 12/4641; H04L 45/08; H04L 63/0876
See application file for complete search history.

(56) References Cited

U.S. PATENT DOCUMENTS 10,630,509 B2 *  4/2020  Bickhart ............. H04L 41/0213
2016/0191374 A1 *  6/2016  Singh ..................... H04L 45/28
                                                         370/228
(Continued)

FOREIGN PATENT DOCUMENTS

CN       105743689 A    7/2016

OTHER PUBLICATIONS

Sajassi, Ali, "EVPN: Network Virtualization Solution for Next Generation DCs & DC Interconnect", Jun. 25-29, 2017, pp. 1-98 (Year: 2017).*

(Continued)

*Primary Examiner* — Salvador E Rivas
(74) *Attorney, Agent, or Firm* — John C. Pokotylo; Pokotylo Patent Services

(57) ABSTRACT

For use in an Ethernet Virtual Private Network (EVPN) in which a site including at least one MAC-addressable device is multihomed, via a customer edge device (CE), to at least two provider edge devices (PE1 and PE2), the potential problem of one of the at least two provider edge devices (PE2) dropping or flooding packets designed for a MAC-addressable device of the multihomed site is solved by controlling advertisements of an auto-discovery per EVPN instance (A-D/EVI) route (or an auto-discovery per Ethernet segment identifier (A-D/ESI) route) to a remote provider edge device (PE3), belonging to the EVPN but not directly connected with the CE. Such advertisements may be controlled by: (a) determining, by PE2, whether or not a MAC-learning condition is met; and (b) responsive to a determination that the MAC-learning condition is met, advertising, by PE2, an A-D/EVI route (or an A-D/ESI route) to the remote provider edge device (PE3), and otherwise, responsive to a determination that the MAC-learning (Continued)

condition is not met, suppressing, by PE2, an A-D/EVI route advertisement (or an A-D/ESI route advertisement).

20 Claims, 10 Drawing Sheets

(51) Int. Cl.
> *H04L 12/24* (2006.01)
> *H04L 12/751* (2013.01)
> *H04L 12/723* (2013.01)
> *H04L 12/721* (2013.01)
> *H04N 21/81* (2011.01)
> *H04L 29/12* (2006.01)
> *H04L 12/913* (2013.01)
> *H04N 21/458* (2011.01)
> *H04M 3/487* (2006.01)

(52) U.S. Cl.
> CPC .......... *H04L 41/0213* (2013.01); *H04L 45/02* (2013.01); *H04L 45/025* (2013.01); *H04L 45/08* (2013.01); *H04L 45/50* (2013.01); *H04L 45/66* (2013.01); *H04L 61/6022* (2013.01); *H04L 63/0272* (2013.01); *H04L 63/0876* (2013.01); *H04N 21/812* (2013.01); *H04L 47/724* (2013.01); *H04M 3/4878* (2013.01); *H04N 21/458* (2013.01)

(56) References Cited

U.S. PATENT DOCUMENTS

2016/0241457 A1* 8/2016 Semwal ................... H04L 45/02
2018/0309596 A1* 10/2018 Brissette ............. H04L 12/4679

OTHER PUBLICATIONS

RFC 7432, "BGP MPLS Ethernet VPN", Feb. 2015 (Year: 2015).*
Sajassi et al, "BGP MPLS Based Ethernet VPN," *draft-ietf-l2vpn-evpn-03*, (Network Working Group of the Internet Engineering Task Force, Feb. 25, 2013).
European Office Action to corresponding European Patent Application No. 19160356.2-1212, dated Aug. 10, 2020 (8 pgs.).
First Office Action to corresponding Chinese Patent Application No. 201910147364.5, dated Jan. 5, 2021 (8 pgs.).
Summons to attend oral proceedings pursuant to Rule 115(1) EPC to corresponding European Patent Application No. 19160356.2-1212.

* cited by examiner

ALIASING BEHAVIOR FOR TRAFFIC TO MULTIHOMED SITES IN ETHERNET VIRTUAL PRIVATE NETWORK (EVPN) NETWORKS

§ 0. RELATED APPLICATION(S)

The present application is a continuation of U.S. patent application Ser. No. 15/942,177, filed on Mar. 30, 2018, titled "IMPROVING ALIASING BEHAVIOR FOR TRAFFIC TO MULTIHOMED SITES IN ETHERNET VIRTUAL PRIVATE NETWORK (EVPN) NETWORKS," and listing Ryan Bickhart and Wen Lin as the inventors (referred to as "the '177 application" and incorporated herein by reference).

§ 1. BACKGROUND

§ 1.1 Field of the Invention

The present disclosure concerns communications networks. More specifically, the present disclosure concerns multihomed access to a transport network in the context of a virtual private network (VPN), such as an Ethernet VPN (EVPN) for example.

§ 1.2 Background Information

The description of art in this section is not, and should not be interpreted to be, an admission that such art is prior art to the present invention.

A computer network is a collection of interconnected computing devices that can exchange data and share resources. Example network devices include layer two devices that operate within the second layer (i.e., L2, or the data link layer) of the Open Systems Interconnection (OSI) reference model, and layer three devices that operate within the third layer (i.e., L3, or the network layer) of the OSI reference model. Network devices (such as routers, switches, etc., generally referred to as "nodes") within computer networks are interconnected through one or more communications links, thereby defining a network topology. Such network nodes often include at least one control unit that provides so-called "control plane" functionality and at least one forwarding unit for routing and/or switching data units, such as packets for example.

§ 1.2.1 Known Private Networking Technologies

For many entities (such as small businesses, universities, etc.), local area networks (or "LANs") suffice for intra-entity communications. Indeed, LANs are quite popular since they are relatively inexpensive to deploy, operate, and manage, and are based on mature, well-developed technology (e.g., Ethernet). Unfortunately, however, most entities need to communicate (e.g., video, voice, and/or data) with their own facilities, or others, beyond their immediate location. Thus, wide area networks (or "WANs") are needed. Very often, entities want at least some privacy or security attached to their communications.

Presently, private long-haul communications can take place over networks that can be generally classified into two types—(1) dedicated WANs that facilitate communications among multiple sites, and (2) public transport networks that allow one or more sites of a private network to communicate. Both of these types of networks are introduced below.

§ 1.2.1.1 Dedicated WANs

Dedicated wide area networks ("WANs") are typically implemented using leased lines or dedicated circuits to connect multiple sites. Customer premise routers or switches at these sites connect these leased lines or dedicated circuits together to facilitate connectivity between each site of the network. Most private networks with a relatively large number of sites will not have "fully meshed" network topologies (i.e., direct connections between each of the sites) due to the cost of leased lines or dedicated circuits and due to the complexity of configuring and managing customer premises equipment. Rather, some form of hierarchical network topology is typically employed in such instances. Unfortunately, dedicated WANs are relatively expensive and typically require the customer to have some networking expertise.

§ 1.2.1.2 Virtual Private Networks (VPNs)

Public transport networks are often used to allow remote users to connect to an enterprise network using some type of transport network technology. (Note that the word "public" in the phrase "public transport network" relays the fact that more than one entity may use it, even though it may be privately owned and managed, and not available to the general public.) Given the expense of WANs, as well as the expertise needed to manage them, virtual private networks (VPNs) using public transport networks have become increasingly popular. Multi-Protocol Label Switching (MPLS) technology is often used in public transport networks.

Ethernet VPNs (EVPNs), such as Border Gateway Protocol (BGP) Multi-Protocol Label Switching (MPLS)-based EVPNs, are now introduced.

§ 1.2.1.2.1 EVPNs (RFC 7209)

Virtual Private LAN Service (VPLS) (e.g., as defined in Request for Comments (RFC) 4664, RFC 4761 and RFC 4762 from the Internet Engineering Task Force (IETF), each of which is incorporated herein by reference) is a proven and widely deployed technology. Unfortunately, VPLS has some limitations with respect to multihoming (i.e., where a customer premise edge device (CE) is connected with more than one service provider edge device (PE) of a transport network, so that a backup/standby link can be used if a primary link fails). RFC 7209 (incorporated herein by reference) specifies requirements for an EVPN to address various issues considered by some to be inadequately addressed by VPLS.

An EVPN may be used to extend two or more remote layer two (L2) customer networks through an intermediate layer three (L3) network (usually referred to as a "service provider transport network," or simply a "transport network") as if the intermediate L3 network does not exist from the perspective of the customer(s) (i.e., in a "transparent" manner). In particular, the EVPN transports L2 communications, such as Ethernet packets or "frames," between customer networks via the transport network. For example, L2 communications may be transported over traffic engineered label switched paths (LSPs) through the transport network (e.g., in accordance with MPLS). In a typical configuration, service provider edge devices (PEs) coupled to the customer edge network devices (CEs) of the customer networks define LSPs within the transport network to carry encapsulated L2 communications as if these customer networks were directly attached to the same local area network (LAN). In some configurations, the PEs may also be connected by an IP infrastructure in which case IP/GRE tunneling or other IP tunneling can be used between the network devices.

In an EVPN, L2 address learning (also referred to as "MAC learning") in a PE device may occur in the control plane, using a routing protocol, rather than in the data plane (as happens with traditional bridging). For example, as described in § 1.2.1.2.2 below, in EVPNs, a PE may use the Border Gateway Protocol (BGP) (which is an L3 routing protocol) to advertise to other PEs media access control (MAC) address(es) learned from the local CEs to which the PE is connected. Specifically, a PE may use BGP route advertisement messages to announce reachability information for the EVPN. These BGP route advertisements may specify one or more MAC addresses learned by the PE device (instead of L3 routing information that is traditionally advertised in BGP route advertisements).

§ 1.2.1.2.2 BGP MPLS-Based EVPNs (RFC 7432)

RFC 7432 (incorporated herein by reference) describes BGP MPLS-based EVPNs. An EVPN "instance" comprises CEs that are connected to PEs that form the edge of the (e.g., MPLS) transport network. As noted above, a CE may be a host, a router, or a switch. As also noted above, the PEs provide virtual Layer 2 bridged connectivity between the CEs. There may be multiple EVPN instances in the service provider transport network.

As further noted above, the PEs may be connected by an MPLS LSP infrastructure, which provides the benefits of MPLS technology, such as fast reroute, resiliency, etc. The PEs may also be connected by an IP infrastructure, in which case IP/GRE (Generic Routing Encapsulation) tunneling or other IP tunneling can be used between the PEs. RFC 7432 concerns procedures only for MPLS LSPs as the tunneling technology. However, such procedures are designed to be extensible to IP tunneling as the Packet Switched Network (PSN) tunneling technology.

As already noted above, in an EVPN, MAC learning between PEs occurs not in the data plane (as happens with traditional bridging in VPLS) but in the control plane. Control-plane learning offers greater control over the MAC learning process, such as restricting who learns what, and the ability to apply policies. Furthermore, the control plane chosen for advertising MAC reachability information is multi-protocol (MP) BGP (similar to IP VPNs described in RFC 4364). This provides flexibility and the ability to preserve the "virtualization" or isolation of groups of interacting agents (hosts, servers, virtual machines) from each other. In EVPN, PEs advertise the MAC addresses learned from the CEs that are connected to them, along with an MPLS label, to other PEs in the control plane using Multi-protocol BGP (MP-BGP). Control-plane learning enables load balancing of traffic to and from CEs that are multi-homed to multiple PEs. This is in addition to load balancing across the MPLS core via multiple LSPs between the same pair of PEs. In other words, it allows CEs to connect to the transport network via multiple active points of attachment. It also improves convergence times in the event of certain network failures.

However, learning between PEs and CEs may be done by the method best suited to the CE (such as data-plane learning, IEEE 802.1x, the Link Layer Discovery Protocol (LLDP), IEEE 802.1aq, Address Resolution Protocol (ARP), management plane, or other protocols).

It is a local decision as to whether the Layer 2 forwarding table on a PE is populated with all the MAC destination addresses known to the control plane, or whether the PE implements a cache-based scheme. For instance, the MAC forwarding table might be populated only with the MAC destinations of the active flows transiting a specific PE.

The policy attributes of EVPN are very similar to those of IP-VPN. An EVPN "instance" may have a Route Distinguisher (RD) that is unique per MAC-VRF and one or more globally unique Route Targets (RTs). A CE may attach to a MAC-VRF on a PE, on an Ethernet interface that may be configured for one or more Ethernet tags, e.g., VLAN IDs. Some deployment scenarios guarantee uniqueness of VLAN IDs across EVPN instances: all points of attachment for a given EVPN instance use the same VLAN ID, and no other EVPN instance uses this VLAN ID (referred to as a "Unique VLAN EVPN").

In network communications systems, protocols are used by devices, such as routers for example, to exchange network information. Routers generally calculate routes (also referred to as "paths") used to forward data packets towards a destination. BGP allows routers (e.g., in different autonomous systems ("ASes")) to exchange reachability information. BGP is summarized below.

The following refers to the version of BGP described in RFC 4271 (incorporated herein by reference). The primary function of a BGP speaking system is to exchange network reachability information with other BGP systems. This network reachability information includes information on the list of Autonomous Systems (ASes) that reachability information traverses. This information is sufficient for constructing a graph of AS connectivity, from which routing loops may be pruned, and, at the AS level, some policy decisions may be enforced.

BGP uses the transmission control protocol ("TCP") as its transport protocol. When a TCP connection is formed between two systems, they exchange messages to open and confirm the connection parameters. The initial data flow is the portion of the BGP routing table that is allowed by the export policy, called the "Adj-Ribs-Out."

Incremental updates are sent as the routing tables change. BGP does not require a periodic refresh of the routing table.

In RFC 4271, a "route" is defined as a unit of information that pairs an address prefix with the set of path attributes. The address prefix can be carried in the Network Layer Reachability Information ("NLRI") field of an UPDATE message or MP_REACH_NLRI attribute, and the set of path attributes is reported in the path attributes field of the same UPDATE message.

Routes are advertised between BGP speakers in UPDATE messages. Multiple destinations that share the same set of path attributes can be advertised in a single UPDATE message by including multiple prefixes in the NLRI field of the UPDATE message, or in the MP_REACH_NLRI path attribute of the UPDATE message.

BGP provides mechanisms by which a BGP speaker can inform its peers that a previously advertised route is no longer available for use. There are three methods by which a given BGP speaker can indicate that a route has been withdrawn from service. First, the IP prefix that expresses the destination for a previously advertised route can be advertised in the WITHDRAWN ROUTES field in the UPDATE message, or reported in the MP_UNREACH path attribute, thus marking the associated route as being no longer available for use. Second, a replacement route with the same NLRI can be advertised. Third, the BGP speaker connection can be closed, which implicitly removes all routes the pair of speakers had advertised to each other from service. Changing the attribute(s) of a route may be accomplished by advertising a replacement route. The replacement route carries new (changed) attributes and has the same address prefix as the original route.

In BGP, UPDATE messages are used to transfer routing information between BGP peers. The information in the UPDATE message can be used to construct a graph that describes the relationships of the various Autonomous Systems. More specifically, an UPDATE message is used to advertise feasible routes that share a common set of path attribute value(s) to a peer (or to withdraw multiple unfeasible routes from service). An UPDATE message may simultaneously advertise a feasible route and withdraw multiple unfeasible routes from service.

The UPDATE message 100 includes a fixed-size BGP header, and also includes the other fields, as shown in FIG. 1A. (Note some of the shown fields may not be present in every UPDATE message). Referring to FIG. 1A, the "Withdrawn Routes Length" field 110 is a 2-octets unsigned integer that indicates the total length of the Withdrawn Routes field 120 in octets. Its value allows the length of the Network Layer Reachability Information field 150 to be determined, as specified below. A value of 0 indicates that no routes are being withdrawn from service, and that the WITHDRAWN ROUTES field 120 is not present in this UPDATE message 100.

The "Withdrawn Routes" field 120 is a variable-length field that contains a list of IP address prefixes for the routes that are being withdrawn from service. Each IP address prefix is encoded as a 2-tuple 120' of the form <length, prefix>. The "Length" field 122 indicates the length in bits of the IP address prefix. A length of zero indicates a prefix that matches all IP addresses (with prefix, itself, of zero octets). The "Prefix" field 124 contains an IP address prefix, followed by the minimum number of trailing bits needed to make the end of the field fall on an octet boundary. Note that the value of trailing bits is irrelevant.

Still referring to FIG. 1A, the "Total Path Attribute Length" field 130 is a 2-octet unsigned integer that indicates the total length of the Path Attributes field 140 in octets. Its value allows the length of the Network Layer Reachability Information field 150 to be determined. A value of 0 indicates that neither the Network Layer Reachability Information field 150, nor the Path Attribute field 140, is present in this UPDATE message.

The "Path Attributes" field 140 is a variable-length sequence of path attributes that is present in every UPDATE message, except for an UPDATE message that carries only the withdrawn routes. Each path attribute is a triple <attribute type, attribute length, attribute value> of variable length. The "Attribute Type" is a two-octet field that consists of the Attribute Flags octet, followed by the Attribute Type Code octet.

Finally, the "Network Layer Reachability Information" field 150 is a variable length field that contains a list of Internet Protocol ("IP") address prefixes. The length, in octets, of the Network Layer Reachability Information is not encoded explicitly, but can be calculated as: UPDATE message Length—23—Total Path Attributes Length (Recall field 130)—Withdrawn Routes Length (Recall field 110), where UPDATE message Length is the value encoded in the fixed-size BGP header, Total Path Attribute Length, and Withdrawn Routes Length are the values encoded in the variable part of the UPDATE message, and 23 is a combined length of the fixed-size BGP header, the Total Path Attribute Length field, and the Withdrawn Routes Length field.

Reachability information is encoded as one or more 2-tuples of the form <length, prefix>150', whose fields are shown in FIG. 1A and described here. The "Length" field 152 indicates the length in bits of the IP address prefix. A length of zero indicates a prefix that matches all IP addresses (with prefix, itself, of zero octets). The "Prefix" field 154 contains an IP address prefix, followed by enough trailing bits to make the end of the field fall on an octet boundary. Note that the value of the trailing bits is irrelevant.

Referring to FIG. 1B, RFC 4760 (incorporated herein by reference) describes a way to use the path attribute(s) field 140 of a BGP update message 100 to carry routing information for multiple Network Layer protocols (such as, for example, IPv6, IPX, L3 VPN, etc.) More specifically, RFC 4760 defines two new path attributes—(1) Mulitprotocol Reachable NLRI ("MP_Reach_NLRI") and (2) Multiprotocol Unreachable NLRI ("MP_Unreach_NLRI"). The first is used to carry the set of reachable destinations together with next hop information to be used for forwarding to these destinations, while the second is used to carry a set of unreachable destinations. Only MP_Reach_NLRI is discussed below.

Referring to FIG. 1B, the MP_Reach_NLRI "path attribute" 140' includes an address family identifier ("AFI") (2 octet) field 141, a subsequent address family identifier ("SAFI") (1 octet) field 142, a length of Next Hop Network Address (1 octet) field 143, a Network Address of Next Hop (variable) field 144, a Reserved (1 octet) field 145 and a Network Layer Reachability Information (variable) field 146. The AFI and SAFI fields 141 and 142, in combination, identify (1) a set of Network Layer protocols to which the address carried in the Next Hop field 144 must belong, (2) the way in which the address of the Next Hop is encoded, and (3) the semantics of the NLRI field 146. The Network Address of Next Hop field 144 contains the Network Address of the next router on the path to the destination system. The NLRI field 146 lists NLRI for feasible routes that are being advertised in the path attribute 140'. That is, the next hop information carried in the MP_Reach_NLRI 140' path attribute defines the Network Layer address of the router that should be used as the next hope to the destination(s) listed in the MP NLRI attribute in the BGP Update message.

Referring back to FIG. 1A, an UPDATE message 100 can advertise, at most, one set of path attributes (Recall field 140), but multiple destinations, provided that the destinations share the same set of attribute value(s). All path attributes contained in a given UPDATE message apply to all destinations carried in the NLRI field 150 of the UPDATE message.

As should be apparent from the description of fields 110 and 120 above, an UPDATE message 100 can list multiple routes that are to be withdrawn from service. Each such route is identified by its destination (expressed as an IP prefix), which unambiguously identifies the route in the context of the BGP speaker—BGP speaker connection to which it has been previously advertised.

An UPDATE message 100 might advertise only routes that are to be withdrawn from service, in which case the message 100 will not include path attributes 140 or Network Layer Reachability Information 150. Conversely, an UPDATE message 100 might advertise only a feasible route, in which case the WITHDRAWN ROUTES field 120 need not be present. An UPDATE message 100 should not include the same address prefix in the WITHDRAWN ROUTES field 120 and Network Layer Reachability Information field 150 or "NLRI" field in the MP_REACH_NLRI path attribute field 146.

§ 1.2.1.2.2.1 Ethernet Segments in a BGP MPLS-Based EVPN

Per RFC 7209, each Ethernet segment needs a unique identifier in an EVPN. This section defines how, under RFC 7432, such identifiers are assigned and how they are encoded for use in EVPN signaling.

When a customer site is connected to one or more PEs via a set of Ethernet links, this set of Ethernet links constitutes a so-called "Ethernet segment." For a multihomed site, each Ethernet segment (ES) is identified by a unique non-zero identifier called an Ethernet Segment Identifier (ESI). Under RFC 7432, an ESI is encoded as a 10-octet integer in line format with the most significant octet sent first.

In general, an Ethernet segment should have a non-reserved ESI that is unique network wide (i.e., across all EVPN instances on all the PEs). If the CE(s) constituting an Ethernet segment is (are) managed by the network operator, then ESI uniqueness should be guaranteed. If, however, the CE(s) is (are) not managed, then the operator must configure a network-wide unique ESI for that Ethernet segment if auto-discovery of Ethernet segments and Designated Forwarder (DF) election is to be enabled.

As far as the CE is concerned, it would treat the multiple PEs that it is connected to as the same switch. This allows the CE to aggregate links that are attached to different PEs in the same bundle.

§ 1.2.1.2.2.2 Ethernet Tag IDs in a BGP MPLS-Based EVPN

An Ethernet Tag ID is a 32-bit field containing either a 12-bit or 24-bit identifier that identifies a particular broadcast domain (e.g., a VLAN) in an EVPN instance. The 12-bit identifier is called the VLAN ID (VID). An EVPN instance consists of one or more broadcast domains (one or more VLANs). VLANs are assigned to a given EVPN instance by the provider of the EVPN service. A given VLAN can itself be represented by multiple VIDs. In such cases, the PEs participating in that VLAN for a given EVPN instance are responsible for performing VLAN ID translation to/from locally attached CE devices. If a VLAN is represented by a single VID across all PE devices participating in that VLAN for that EVPN instance, then there is no need for VID translation at the PEs. Furthermore, some deployment scenarios guarantee uniqueness of VIDs across all EVPN instances; all points of attachment for a given EVPN instance use the same VID, and no other EVPN instances use that VID. This allows the route targets (RTs) for each EVPN instance to be derived automatically from the corresponding VID, as described in Section 7.10.1 of RFC 7432.

§ 1.2.1.2.2.3 BGP EVPN Routes in a BGP MPLS-Based EVPN

RFC 7432 defines a new BGP Network Layer Reachability Information (NLRI) called the EVPN NLRI. As shown in FIG. 2, the EVPN NLRI 150" includes a Route Type (1 octet) field 210, a length (1 octet) field 220 and a Route Type specific (variable length) field 230. The Route Type field 210 defines the encoding of the rest of the EVPN NLRI (Route Type specific EVPN NLRI). The Length field 220 indicates the length in octets of the Route Type specific field 230 of the EVPN NLRI 150". Although RFC 7432 describes (1) Ethernet Auto-Discovery (A-D) route, (2) MAC/IP Advertisement route, (3) Inclusive Multicast Ethernet Tag route and (4) Ethernet Segment route, route types, only Ethernet A-D routes are described here.

The EVPN NLRI may be carried in BGP (RFC 4271 using BGP Multiprotocol Extensions (RFC 4760, incorporated herein by reference), with an Address Family Identifier (AFI) of 25 (L2VPN) and a Subsequent Address Family Identifier (SAFI) of 70 (EVPN). The NLRI field in the MP_REACH_NLRI/MP_UNREACH_NLRI attribute contains the EVPN NLRI (encoded as specified above).

For two BGP speakers to exchange labeled EVPN NLRI, they must use BGP Capabilities Advertisements to ensure that they both are capable of properly processing such NLRI. This is done as specified in RFC 4760, by using capability code 1 (multiprotocol BGP) with an AFI of 25 (L2VPN) and a SAFI of 70 (EVPN).

Still referring to FIG. 2, an Ethernet A-D route type specific EVPN NLRI 230' includes a Route Distinguisher (RD) (8 octets) field 232, an Ethernet Segment Identifier (10 octets) field 234, an Ethernet Tag ID (4 octets) field 236, and an MPLS Label (3 octets) field 238.

For BGP route key processing, only the Ethernet Segment Identifier 234 and the Ethernet Tag ID 236 are considered to be part of the prefix 154' in the NLRI 150'. The MPLS Label field 238 is to be treated as a route attribute as opposed to being part of the route.

§ 1.2.1.2.2.4 Multihoming Functions in a BGP MPLS-Based EVPN

RFC 7432 describes the functions, procedures, and associated BGP routes used to support multihoming in EVPN, and covers both multihomed device (MHD) and multihomed network (MHN) scenarios. Section 8.4 of RFC 7432, which concerns Aliasing and Backup Path, is of particular relevance to the present disclosure.

FIG. 3 illustrates an example EVPN environment 300 in which embodiments consistent with the present description may operation. As shown in the example environment 300, an EVPN may be used to extend two or more remote layer two (L2) customer networks (sites A and B) 310a and 310b through an intermediate layer three (L3) network (usually referred to as a service provider transport network, or simply a transport network) 320. As already discussed earlier, the EVPN connects the two remote customer networks 310a and 310b in a so-called "transparent" manner (that is, as if the intermediate L3 network 320 does not exist from the perspective of the two remote customer networks 310a and 310b).

As noted above, if the service provider transport network 320 employs MPLS forwarding, the EVPN transports L2 communications, such as Ethernet packets or "frames," between customer networks 310a and 310b via traffic engineered label switched paths (LSPs) through the transport network 320 in accordance with one or more MPLS protocols. In some configurations, the PEs 310a, 310b, 310c may also be connected by an IP infrastructure, in which case IP/GRE tunneling or other IP tunneling can be used between the PEs.

In the example environment 300, the customer network-site A 310a is "multihomed" to the transport network 320 via CEa 315a and PE1 330a and PE2 330b. Multihoming may be used to increase network reliability (e.g., by having multiple links between the customer network-site A 310a and the transport network 320), and/or for load balancing (e.g., by dividing packet flows such that they go over different links, thereby avoiding the concentration of too much network traffic on a single link).

In some multihomed implementations, only one of the local PEs (330a and 330b) is active, while the other(s) is in standby (also referred to as "single active" or "active-standby"). Such implementations are mainly used for network resiliency, but are not helpful for load balancing. For example, if customer device 312a1 (at customer network-site A 310a) is sending a flow of packets to customer device 312b1 (at customer network-site A 310b), and customer device 312aN is sending a flow of packets to customer device 312bR, both flows go through an active PE (e.g., PE1 330a). If the active PE fails (or if the link to (or an interface of the link to the active PE) fails), the standby PE (e.g., PE2 330b) becomes active.

In other multihomed implementations, all of the local PEs (330a and 330b) are active simultaneously (referred to as "all active," or "active-active"). Such implementations are useful for load balancing network traffic. For example, if customer device 312a1 (at customer network-site A 310a) is sending a flow of packets to customer device 312b1 (at customer network-site B 310b), and customer device 312aN is sending a flow of packets to customer device 312bR, one flows might go through active PE1 330a and the other flow might go through active PE2 330b. There are many known schemes for load balancing (e.g., hashing packet header data (for example, a source/destination address pair) to a particular path).

In the case where a CE is multihomed to multiple PEs, e.g., using a Link Aggregation Group (LAG) (See, RFC 7424, incorporated herein by reference) with All-Active redundancy, it is possible that only a single PE learns a set of the MAC addresses associated with traffic transmitted by the CE. This leads to a situation in which one or more remote PEs receive MAC/IP Advertisement routes for these addresses from a single PE, even though multiple PEs are connected to the multihomed Ethernet segment. As a result, the remote PEs are not able to effectively load balance traffic among the PE nodes connected to the multihomed Ethernet segment. This could be the case, for example, when the PEs perform data-plane learning on the access, and the load-balancing function on the CE hashes traffic from a given source MAC address to a single PE.

Another scenario where this occurs is when the PEs rely on control-plane learning on the access (e.g., using ARP), since ARP traffic will be hashed to a single link in the LAG.

To address this issue, EVPN introduces the concept of "aliasing," which is the ability of a PE to signal that it has reachability to an EVPN instance on a given ES even when it has learned no MAC addresses from that EVI/ES. The Ethernet A-D per EVI route is used for this purpose. A remote PE that receives a MAC/IP Advertisement route with a non-reserved ESI should consider the advertised MAC address to be reachable via all PEs that have advertised reachability to that MAC address's EVI/ES via the combination of an Ethernet A-D per EVI route for that EVI/ES (and Ethernet tag, if applicable) and Ethernet A-D per ES routes for that ES with the "Single-Active" bit in the flags of the ESI Label extended community set to 0. Note that the Ethernet A-D per EVI route may be received by a remote PE before it receives the set of Ethernet A-D per ES routes. Therefore, to handle corner cases and race conditions, the Ethernet A-D per EVI route is not to be used for traffic forwarding by a remote PE until it also receives the associated set of Ethernet A-D per ES routes.

The backup path is a closely related function, but it is used in Single-Active redundancy mode. In this case, a PE also advertises that it has reachability to a given EVI/ES using the same combination of Ethernet A-D per EVI route and Ethernet A-D per ES route as discussed above, but with the "Single-Active" bit in the flags of the ESI Label extended community set to 1. A remote PE that receives a MAC/IP Advertisement route with a non-reserved ESI should consider the advertised MAC address to be reachable via any PE that has advertised this combination of Ethernet A-D routes, and it should install a backup path for that MAC address.

An Ethernet A-D per EVPN instance (EVI) route (which is used for aliasing) may be constructed as follows. The Route Distinguisher (RD) is set per section 7.9 of RFC 7432. The Ethernet Segment Identifier is a 10-octet entity as described in section 5 of RFC 7432. The Ethernet A-D route is not needed when the Segment Identifier is set to 0. The Ethernet Tag ID is the identifier of an Ethernet tag on the Ethernet segment. This value may be a 12-bit VLAN ID, in which case the low-order 12 bits are set to the VLAN ID and the high-order 20 bits are set to 0. Alternatively, it may be another Ethernet tag used by the EVPN. It may be set to the default Ethernet tag on the Ethernet segment or to the value 0. Note that the above allows the Ethernet A-D route to be advertised with one of the following granularities:

One Ethernet A-D route per <ESI, Ethernet Tag ID> tuple per MAC-VRF. This is applicable when the PE uses MPLS-based disposition with VID translation or may be applicable when the PE uses MAC-based disposition with VID translation.

One Ethernet A-D route for each <ESI> per MAC-VRF (where the Ethernet Tag ID is set to 0). This is applicable when the PE uses MAC-based disposition or MPLS-based disposition without VID translation.

The usage of the MPLS label is described in section 14 of RFC 7432. The Next Hop field of the MP_REACH_NLRI attribute of the route is to be set to the IPv4 or IPv6 address of the advertising PE. The Ethernet A-D route is to carry one or more Route Target (RT) attributes, per section 7.10 of RFC 7432.

Referring once again to FIG. 3, consider the EVPN network 300 with three PEs PE1 330a, PE2 330b, and PE3 330c. PE1 330a and PE2 330b are attached to the same multihomed customer network-site A 310a and serve as multihoming PEs for this customer network-site A 310a. PE3 330c is a remote PE from the PE1/PE2 perspective and is not attached to the same customer network-site A 310a, but rather, is attached to a second customer network-site B 310b of the same customer.

Suppose PE2 330b is initially offline. Therefore, PE1 330a initially learns all local MACs (e.g., of customer devices 312a1 . . . 312aN) for devices residing in the multihomed customer network-site A 310a. PE1 330a advertises the learned MACs, via the EVPN control plane (e.g., using BGP update messages), to remote PE3 330c to allow PE3 330c to send known unicast traffic to devices 312a1 . . . 312aN attached to the multihomed customer network-site A 310A via PE1 330a.

If and when PE2 330b is brought online and its interfaces come up, it can optionally advertise an auto-discovery per EVPN instance ("AD/EVI") route to indicate to one or more remote PEs that it 330b can forward known unicast traffic toward the multihomed customer network-site A 310a, even if PE2 330b has not explicitly advertised every individual MAC from the multihomed site. This "aliasing" behavior was described above. Unfortunately, however, this behavior has the potential to cause problems. More specifically, depending on its implementation, PE2 330b might be unable to forward known unicast traffic for a given MAC to the multihomed customer network-site A 310a until it has installed a MAC route in its local MAC table. Such a local MAC route would be learned by PE2 330b either (A) through local learning once the link to the multihomed customer network-site A 310a comes up, or (B) though control plane learning of MACs reachable via the multihomed customer network-site A 310a advertised by PE1 330a. Unfortunately, if PE2 330b advertises its AD/EVI route to PE3 330b before installing all MACs (e.g., from PE1 330a, or through local learning), aliased traffic sent by PE3 330c to PE2 330b for transmission onward to a device on the multihomed customer network-site A 310a might not be forwarded optimally. More specifically, depending on the implementation, PE2 330b might have to drop the traffic or flood it inefficiently.

Thus, there is a need to improve aliasing (e.g., under RFC 7432).

§ 2. SUMMARY OF THE INVENTION

For use in an Ethernet Virtual Private Network (EVPN) in which a site including at least one MAC-addressable device is multihomed, via a customer edge device (CE), to at least two provider edge devices (PE1 and PE2), the potential problem of one of the at least two provider edge devices (PE2) dropping or flooding packets designed for a MAC-addressable device of the multihomed site is solved by controlling advertisements of an auto-discovery per EVPN instance (A-D/EVI) route (or an auto-discovery per Ethernet segment identifier (A-D/ESI) route) to a remote provider edge device (PE3), belonging to the EVPN but not directly connected with the CE. Such advertisements may be controlled by: (a) determining, by PE2, whether or not a MAC-learning condition is met; and (b) responsive to a determination that the MAC-learning condition is met, advertising, by PE2, an A-D/EVI route (or an A-D/ESI route) to the remote provider edge device (PE3), and otherwise, responsive to a determination that the MAC-learning condition is not met, suppressing, by PE2, an A-D/EVI route advertisement (or an A-D/ESI route advertisement).

In some such embodiments, the MAC-learning condition is that PE2 has received all MAC advertisements from any other PEs belonging to the EVPN and directly connected to the same multihomed site. In some other such embodiments, the MAC-learning condition is that a predetermined time (which has been selected to be sufficient for local MAC address learning) has elapsed since a link to the multihomed site has come up. In some example embodiments, the MAC leaning condition is that both (1) PE2 has received all MAC advertisements from any other PEs belonging to the EVPN and directly connected to the same multihomed site, and (2) a predetermined time (which has been selected to be sufficient for local MAC address learning) has elapsed since a link to the multihomed site has come up. In still other such example embodiments, the MAC learning condition is that a border gateway protocol (BGP) end of route information base (RIB) (EOR) message has been received from any other multihomed provider edge devices directed connected with the multihomed site and belonging to the EVPN. In yet still other such example embodiments, the MAC learning condition is that the PE has ensured that all necessary MAC routes for the multihomed site have been programmed in its MAC table.

In some example embodiments, the customer edge device (CE) is multihomed with the at least two provider edge devices (PE1 and PE2) via a link aggregation group (LAG).

Some example embodiments, responsive to a determination that the MAC-learning condition is met, PE2 advertises an A-D/ESI route to PE3, and otherwise, responsive to a determination that the MAC-learning condition is not met, PE2 suppresses an A-D/ESI route advertisement.

§ 3. BRIEF DESCRIPTION OF THE DRAWINGS

Figure 4:
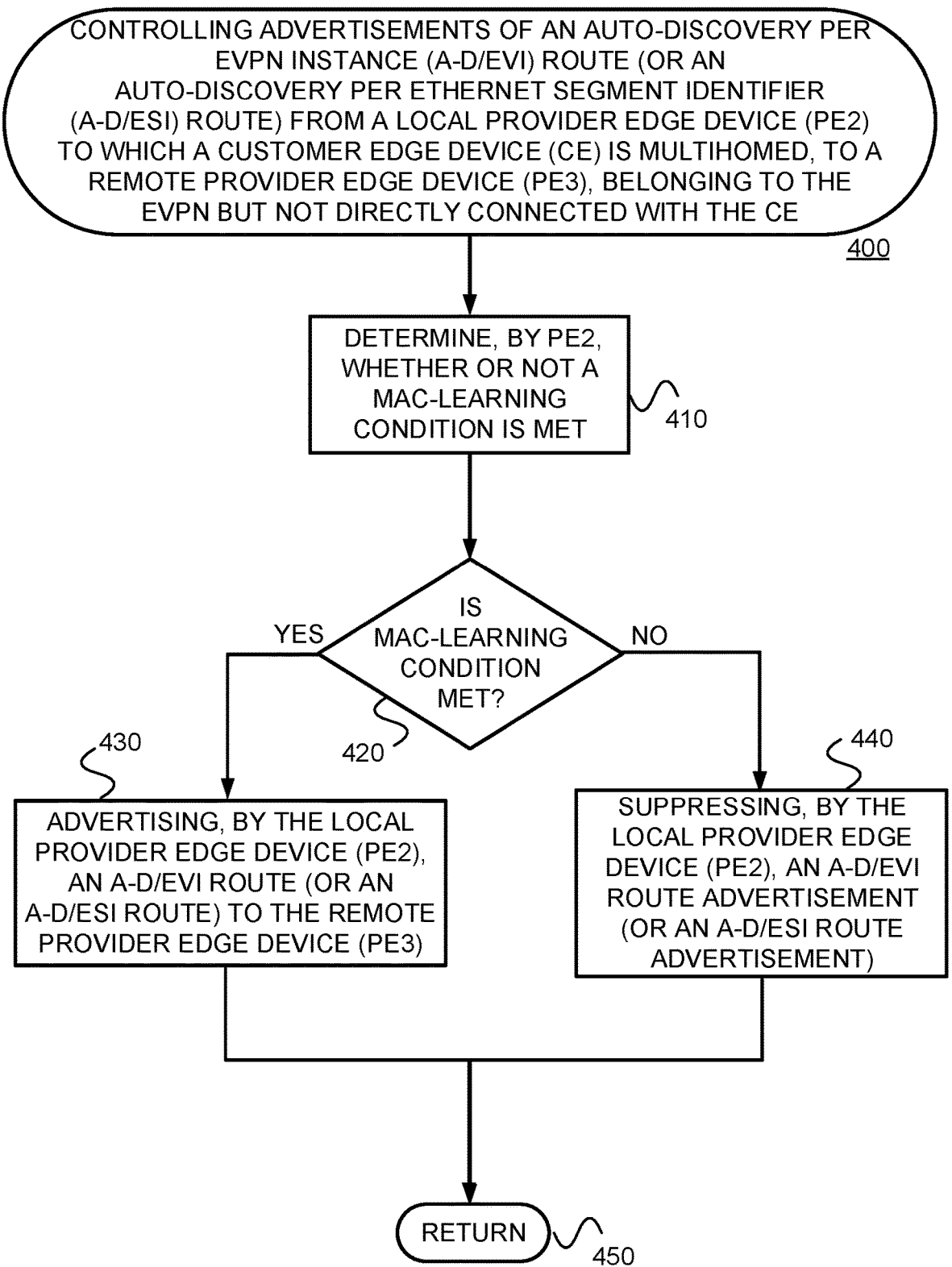

FIG. 4 is a flow diagram of an example method for controlling advertisements of an auto-discovery per EVPN instance (A-D/EVI) route (or an auto-discovery per Ethernet segment identifier (A-D/ESI) route) to a remote provider edge device (PE3), belonging to the EVPN but not directly connected with the CE, in a way that reduces the probability of one of the at least two provider edge devices (PE2) dropping or flooding packets designed for a MAC addressable device of the multihomed site, in a manner consistent with the present disclosure.

Figure 5:
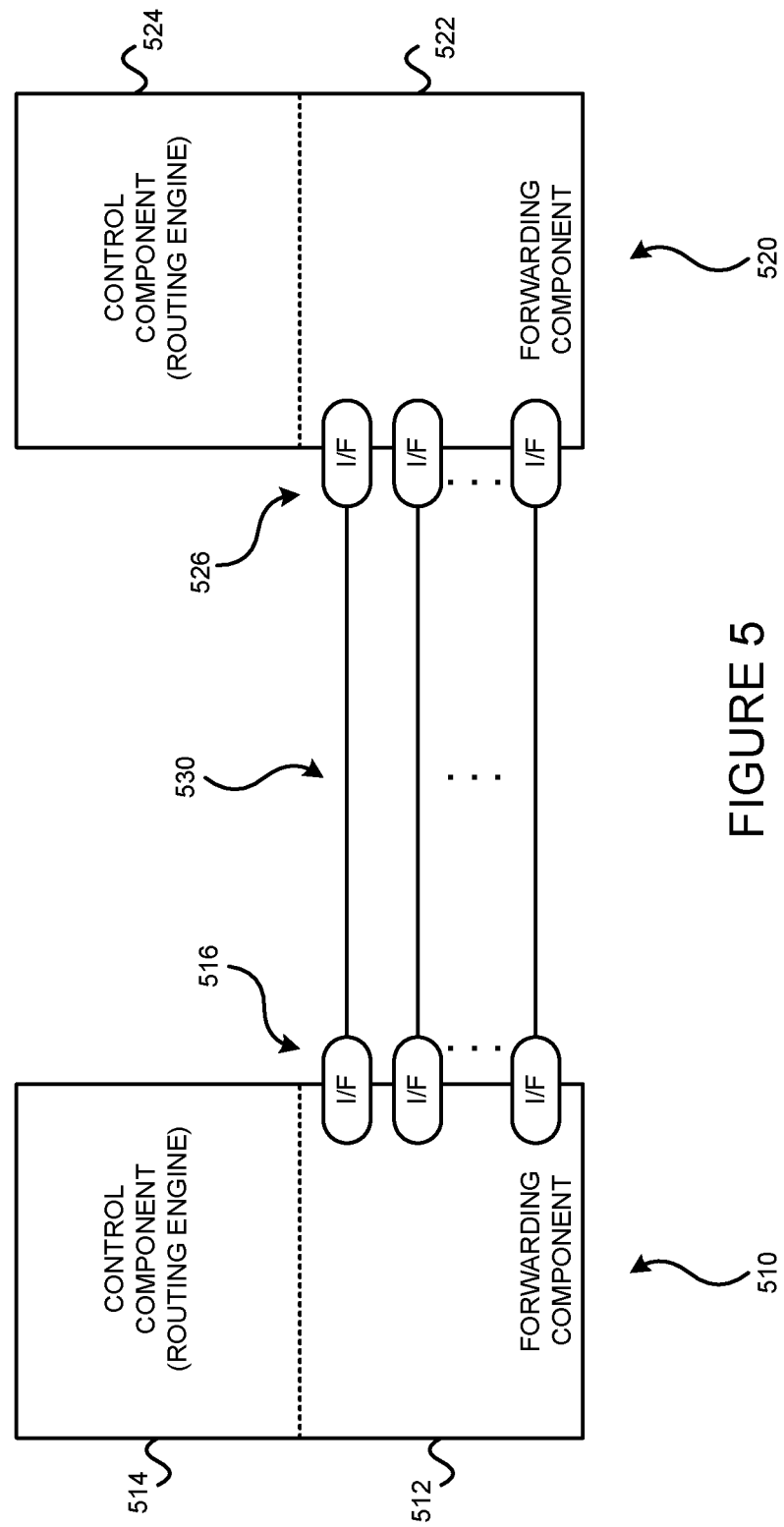

FIG. 5 illustrates an example environment including two systems coupled via communications links.

Figure 6:
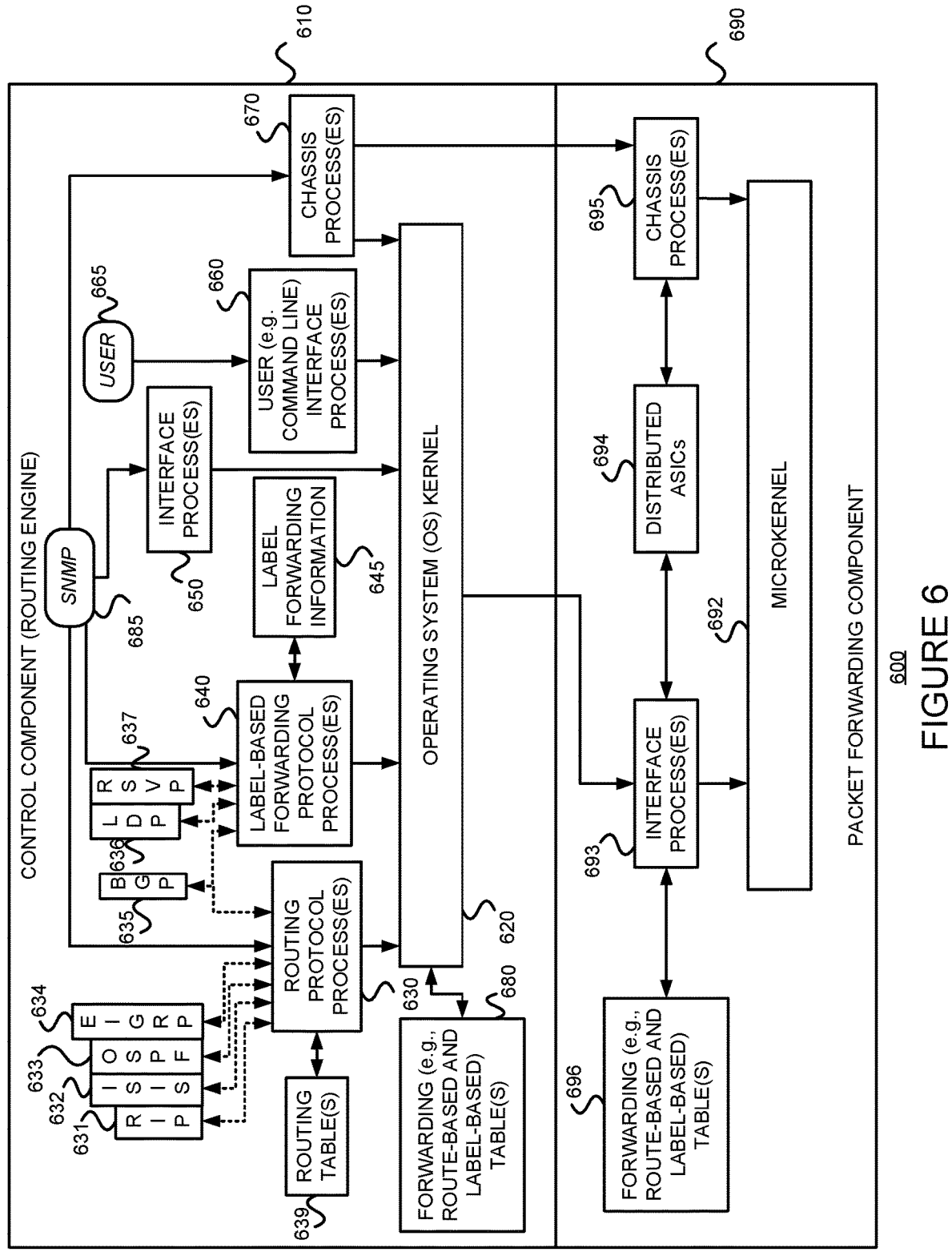

FIG. 6 is a block diagram of an example router on which one or more aspects of the present disclosure may be implemented.

Figure 7:
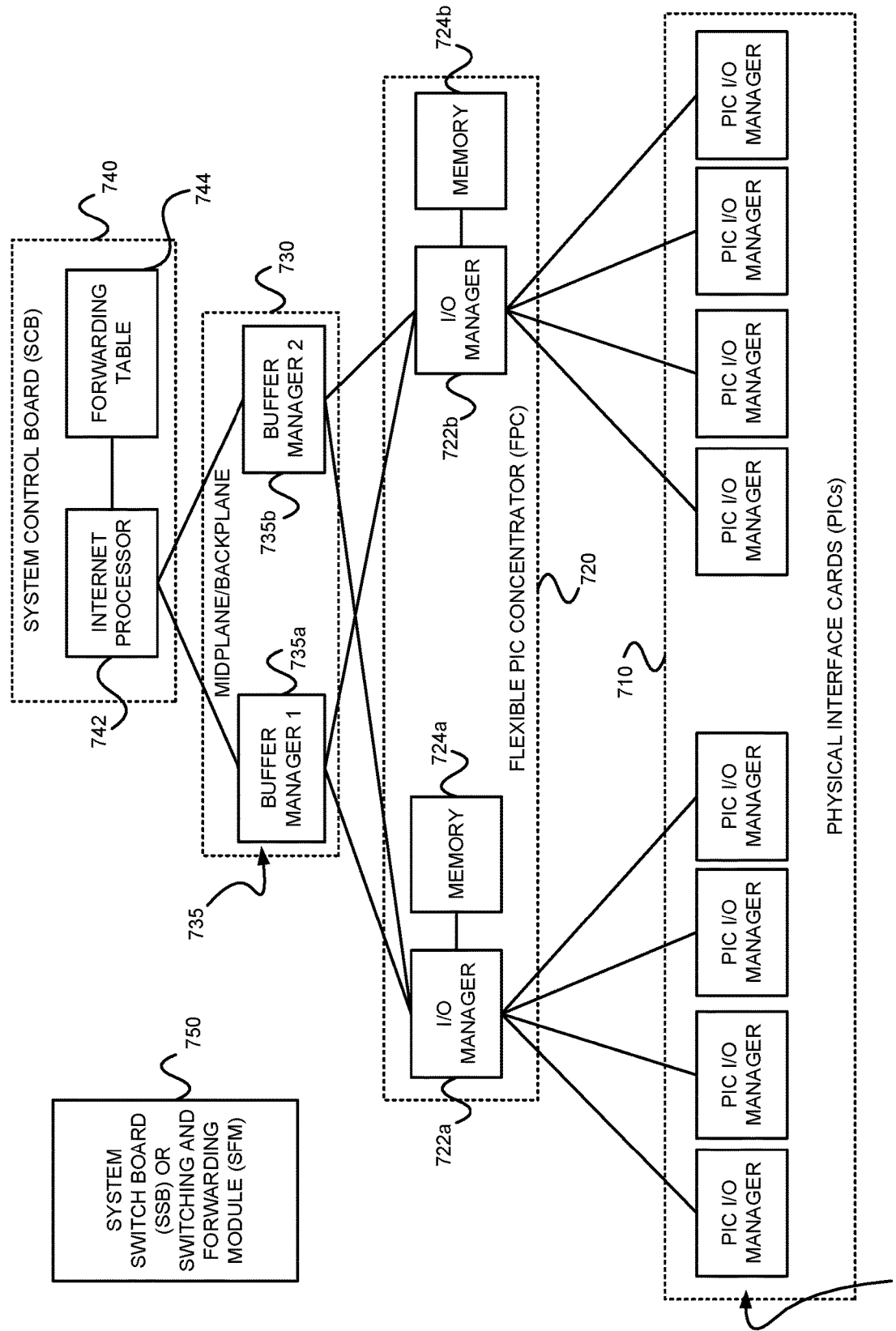

FIG. 7 is a block diagram of example distributed application specific integrated circuits ("ASICs") that may be provided in the example router of FIG. 6.

Figure 8A:
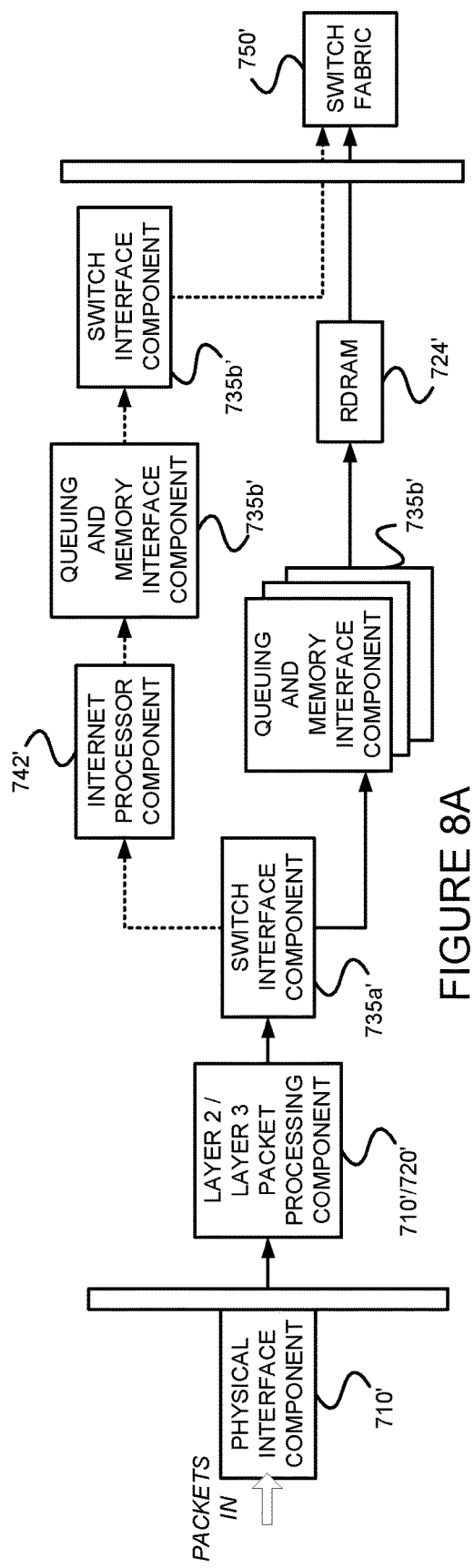
Figure 8B:
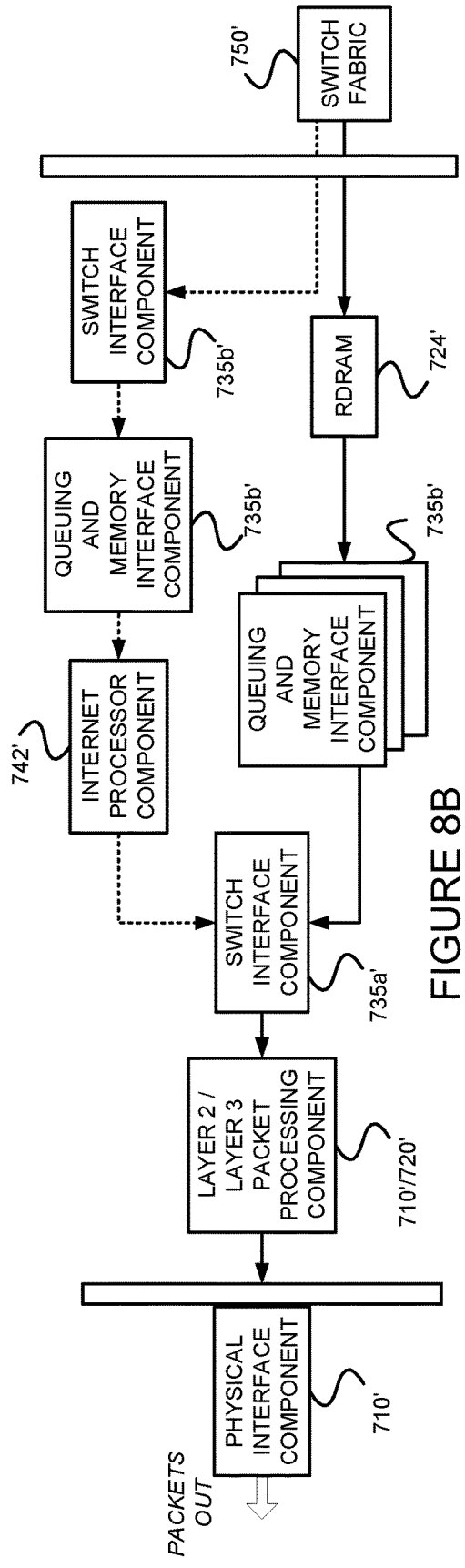

FIGS. 8A and 8B illustrate example packet forwarding operations of the example distributed ASICs of FIG. 7.

Figure 9:
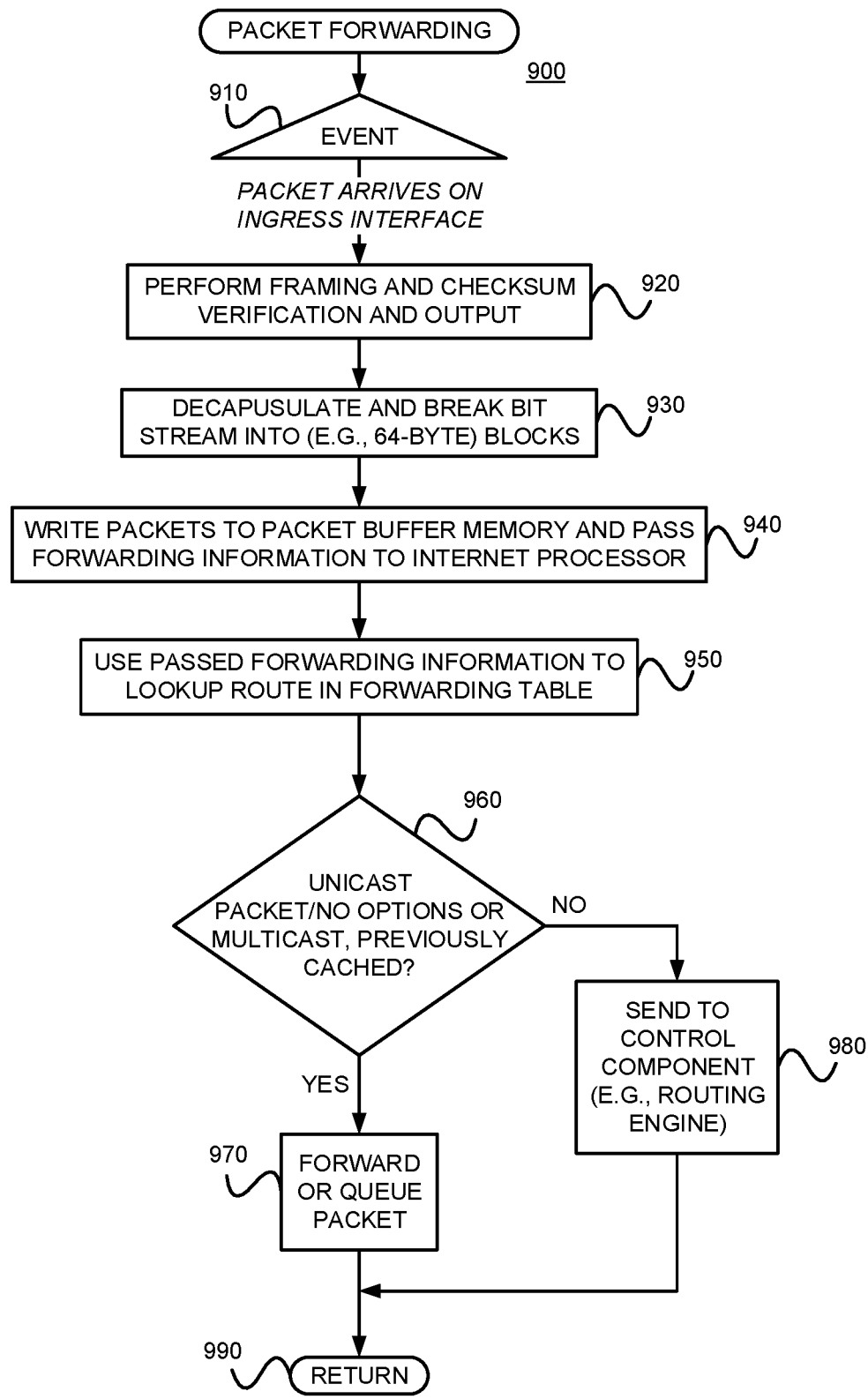

FIG. 9 is a flow diagram of an example packet forwarding method that may be implemented on any of the example routers of FIGS. 6 and 7.

Figure 10:
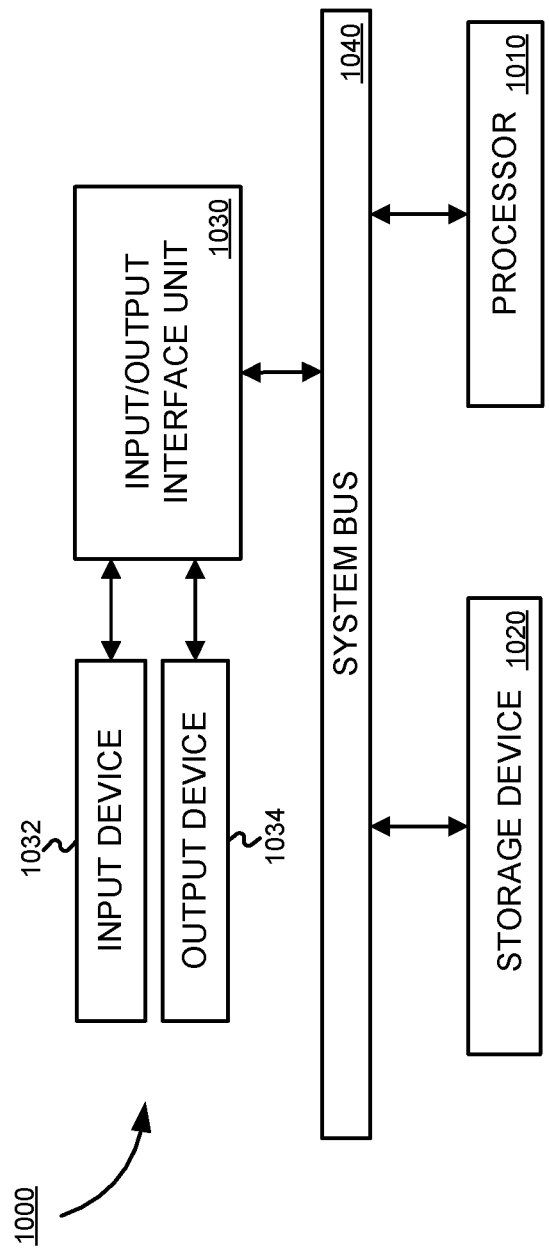

FIG. 10 is a block diagram of an example processor-based system that may be used to execute the example methods described, and/or to store information used and/or generated by such example methods.

§ 4. DETAILED DESCRIPTION

The present disclosure may involve novel methods, apparatus, message formats, and/or data structures for controlling advertisements of an auto-discovery per EVPN instance (A-D/EVI) route (or an auto-discovery per Ethernet segment identifier (A-D/ESI) route) to a remote provider edge device (PE3), belonging to the EVPN but not directly connected with the CE, in a way that reduces the probability of one of the at least two provider edge devices (PE2) dropping or flooding packets designed for a MAC addressable device of the multihomed site. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Definitions

The following terms may be used in this disclosure.

"Adj-RIB-In" contains unprocessed routing information that has been advertised to a local BGP speaker by its peers.

"Adj-RIB-Out" contains the routes for advertisement to specific peers by means of the local speaker's UPDATE messages.

"All-Active Redundancy Mode": When all PEs attached to an Ethernet segment are allowed to forward known unicast traffic to/from that Ethernet segment for a given VLAN, then the Ethernet segment is defined to be operating in All-Active redundancy mode.

"BGP Identifier": A 4-octet unsigned integer that indicates the BGP Identifier of the sender of BGP messages. A given BGP speaker sets the value of its BGP Identifier to an IP address assigned to that BGP speaker. The value of the BGP Identifier is determined upon startup and is the same for every local interface and BGP peer.

"BGP speaker": A router that implements BGP.

"Broadcast Domain": In a bridged network, the broadcast domain corresponds to a Virtual LAN (VLAN), where a VLAN is typically represented by a single VLAN ID (VID) but can be represented by several VIDs where Shared VLAN Learning (SVL) is used per IEEE 802.1Q.

"Bridge Table": An instantiation of a broadcast domain on a MAC-VRF.

"CE": Customer Edge device (e.g., a host, router, or switch).

"Ethernet Segment" (or "ES"): When a customer site (device or network) is connected to one or more PEs via a set of Ethernet links, then that set of links is referred to as an 'Ethernet segment'.

"Ethernet Segment Identifier" (or "ESI"): A unique non-zero identifier that identifies an Ethernet segment is called an 'Ethernet Segment Identifier'.

"Ethernet Tag": An Ethernet tag identifies a particular broadcast domain, e.g., a VLAN.

An EVPN instance consists of one or more broadcast domains.

"External BGP (or "eBGP")": A BGP connection between external peers.

"EVI": An EVPN instance spanning the Provider Edge (PE) devices participating in that EVPN.

"Feasible route": An advertised route that is available for use by the recipient.

"Internal BGP (or iBGP")": A BGP connection between internal peers.

"Interior Gateway Protocol (or "IGP")": A routing protocol used to exchange routing information among routers within a single Autonomous System (AS).

"Local": In the context of a transport network, a device or network is local if it can be reached without going through any transit routers or links of the transport network.

"Loc-RIB": A routing information based that contains the routes that have been selected by the local BGP speaker's Decision Process.

"MAC-VRF": A Virtual Routing and Forwarding table for Media Access Control (MAC) addresses on a PE.

"NLRI": Network Layer Reachability Information.

"PE": Provider Edge device.

"Remote": In the context of a transport network, a device or network is remote if it cannot be reached without going through any transit routers or links of the transport network.

"Route": A unit of information that pairs a set of destinations with the attributes of a path to those destinations. The set of destinations are systems whose IP addresses are contained in one IP address prefix carried in the Network Layer Reachability Information (NLRI) field of an UPDATE message. The path is the information reported in the path attributes field of the same UPDATE message.

"RIB": Routing Information Base.

"Single-Active Redundancy Mode": When only a single PE, among all the PEs attached to an Ethernet segment, is allowed to forward traffic to/from that Ethernet segment for a given VLAN, then the Ethernet segment is defined to be operating in Single-Active redundancy mode.

§ 4.2 Example Methods

FIG. 4 is a flow diagram of an example method 400 for controlling advertisements of an auto-discovery per EVPN instance (A-D/EVI) route or an auto-discovery per Ethernet segment identifier (A-D/ESI) route to a remote provider edge device (PE3), belonging to the EVPN but not directly connected with the CE, in a way that reduces the probability of one of the at least two provider edge devices (PE2) dropping or flooding packets designed for a MAC address-able device of the multihomed site, in a manner consistent with the present disclosure. The example method 400 determines (by PE2) whether or not a MAC-learning condition is met. (Block 410) Responsive to a determination that the MAC-learning condition is met (420, YES), the method 400 advertises (by PE2) an A-D/EVI route (or an A-D/ESI route) to the remote provider edge device (PE3) (Block 430), before the method 400 is left (Node 450). Otherwise, responsive to a determination that the MAC-learning condition is not met (420, NO), the method 400 suppresses (by PE2) an A-D/EVI route advertisement (or an A-D/ESI route advertisement) (Block 440), before the method 400 is left (Node 450).

Referring back to block 420, the MAC-learning condition may be
  a) that PE2 has received all MAC advertisements from any other PEs belonging to the EVPN and directly connected to the same multihomed site;
  b) that a predetermined time (which has been selected to be sufficient for local MAC address learning) has elapsed since a link to the multihomed site has come up;
  c) that a border gateway protocol (BGP) end of route information base (RIB) (EOR) message has been received from any other multihomed provider edge devices directed connected with the multihomed site and belonging to the EVPN;
  d) that the PE has ensured that all necessary MAC routes for the multihomed site have been programmed in its MAC table; or
  e) any combination for the foregoing MAC-learning conditions.

In some example embodiments, the customer edge device (CE) is multihomed with the at least two provider edge devices (PE1 and PE2) via a link aggregation group (LAG).

As should be apparent from the foregoing, in some example implementations, PE2 controls advertisement of the AD/EVI route and advertises it only when it is ready for forward known unicast traffic toward the multihomed site. For example, PE2 could postpone advertisement of the AD/EVI route until it has received all MAC advertisements from the other multihoming PEs connected to the same multihomed site, or wait until after a given amount time has passed once the link to the multihomed site has come up to allow adequate time for local MAC learning, or some combination of both. Determination of reception of all MAC routes could be implemented by waiting to receive a BGP end of RIB (EOR) message from all other multihomed PEs connected to the same site. Thus, PE2 can be certain that it has all necessary MAC routes programmed in its MAC table before advertising the AD/EVI route which will solicit aliased multihoming traffic to be sent by PE3 to PE2.

As an alternative, PE2 may delaying advertisement of the auto-discovery per ESI ("AD/ESI") route instead of the AD/EVI route. However, any MACs locally learned and advertised by PE2 cannot be used by remote PEs until the AD/ESI route is also received (this is RFC mandated behavior). Therefore, it is advantageous to implement the invention using the AD/EVI route as this allows forwarding for MACs explicitly advertised by PE2 to be load balanced across PE1 and PE2 even before PE2 solicits aliased traffic using the AD/EVI route.

§ 4.3 Example Apparatus

FIG. 5 illustrates two data forwarding systems 510 and 520 coupled via communications links 530. The links may be physical links or "wireless" links. The data forwarding systems 510,520 may be routers for example. If the data forwarding systems 510,520 are example routers, each may include a control component (e.g., a routing engine) 514,524 and a forwarding component 512,522. Each data forwarding system 510,520 includes one or more interfaces 516,526 that terminate one or more communications links 530. Assuming the device 510 is a customer edge device (CE) and the device 520 is a provider edge device (PE), the example method 400 described above may be implemented in the control component 524 of device 520.

As just discussed above, and referring to FIG. 6, some example routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 645, and forwarding (e.g., route-based and/or label-based) table(s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the boarder gateway protocol ("BGP") 635, and the label-based forwarding protocol process(es) 640 may support protocols such as BGP 635, the label distribution protocol ("LDP") 636 and the resource reservation protocol ("RSVP") 637. One or more components (not shown) may permit a user 665 to interact with the user interface process(es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692, interface process(es) 693, distributed ASICs 694, chassis process(es) 695 and forwarding (e.g., route-based and/or label-based) table(s) 696.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols and/or label-based forwarding protocols, maintaining the routing tables and/or label forwarding information, sending forwarding table updates to the packet forwarding component 690, and performing system management. The example control component 610 may handle routing protocol packets, provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols may be provided in addition, or alternatively. Similarly, the label-based forwarding protocol process(es) 640 provides label forwarding and label control functions. In this example, the LDP 636 and RSVP 637 (and BGP 635) protocols are provided. Naturally, other label-based forwarding protocols (e.g., MPLS) may be provided in addition, or alternatively. In the example router 600, the routing table(s) 639 is produced by the routing protocol process(es) 630, while the label forwarding information 645 is produced by the label-based forwarding protocol process(es) 640.

Still referring to FIG. 6, the interface process(es) 650 performs configuration of the physical interfaces (Recall, e.g., 516 and 526 of FIG. 5) and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 660 via a console port, an auxiliary port, and/or a management Ethernet port.

The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692, interface process(es) 693, distributed ASICs 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table(s) 696 is static until a new one is received from the control component 610. The interface process(es) 693 uses the forwarding table(s) 696 to look up next-hop information. The interface process(es) 693 also has direct communication with the distributed ASICs 694. Finally, the chassis process(es) 695 may communicate directly with the microkernel 692 and with the distributed ASICs 694.

In the example router 600, the example method 400 consistent with the present disclosure may be implemented in the BGP protocol 635.

Referring back to distributed ASICs 694 of FIG. 6, FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750. Each of the PICs 710 includes one or more PIC I/O managers 715. Each of the FPCs 720 includes one or more I/O managers 722, each with an associated memory 724. The midplane/backplane 730 includes buffer managers 735a, 735b. Finally, the system control board 740 includes an internet processor 742 and an instance of the forwarding table 744 (Recall, e.g., 696 of FIG. 6).

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain from one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Referring to FIGS. 7, 8A and 8B, in some exemplary routers, each of the PICs 710,610' contains at least one I/O manager ASIC 715 responsible for media-specific tasks, such as encapsulation. The packets pass through these I/O ASICs on their way into and out of the router. The I/O manager ASIC 715 on the PIC 710,610' is responsible for managing the connection to the I/O manager ASIC 722 on the FPC 720,620', managing link-layer framing and creating the bit stream, performing cyclical redundancy checks (CRCs), and detecting link-layer errors and generating alarms, when appropriate. The FPC 720 includes another I/O manager ASIC 722. This ASIC 722 takes the packets from the PICs 710 and breaks them into (e.g., 74-byte) memory blocks. This FPC I/O manager ASIC 722 sends the blocks to a first distributed buffer manager (DBM) 735a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 735a' manages and writes packets to the shared memory 724 across all FPCs 720. In parallel, the first DBM ASIC 735a' also extracts information on the destination of the packet and passes this forwarding-related information to the Internet processor 742/642'. The Internet processor 742/642' performs the route lookup using the forwarding table 744 and sends the information over to a second DBM ASIC 735b'. The Internet processor ASIC 742/642' also collects exception packets (i.e., those without a forwarding table entry) and sends them to the control component 610. The second DBM ASIC 735b' then takes this information and the 74-byte blocks and forwards them to the I/O manager ASIC 722 of the egress FPC 720/620' (or multiple egress FPCs, in the case of multicast) for reassembly. (Thus, the DBM ASICs 735a' and 735b' are responsible for managing the packet memory 724 distributed across all FPCs 720/620', extracting forwarding-related information from packets, and instructing the FPC where to forward packets.)

The I/O manager ASIC 722 on the egress FPC 720/620' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/620' may be responsible for receiving the blocks from the second DBM ASIC 735$b'$, incrementing TTL values, queuing a pointer to the packet, if necessary, before applying CoS rules, re-encapsulating the blocks, and sending the encapsulated packets to the PIC I/O manager ASIC 715.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735$b$. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present disclosure may be implemented on the example routers of FIG. 5 or 6, embodiments consistent with the present disclosure may be implemented on communications network nodes (e.g., routers, switches, etc.) having different architectures. More generally, embodiments consistent with the present disclosure may be implemented on an example system 1000 as illustrated on FIG. 10.

FIG. 10 is a block diagram of an exemplary machine 1000 that may perform one or more of the methods described, and/or store information used and/or generated by such methods. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components of the invention.

In some embodiments consistent with the present disclosure, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 Refinements and Alternatives

Although described as routers and/or switches, PEs may represent other types of devices capable of performing PE operations for an Ethernet Virtual Private Network (EVPN).

Figure 1:
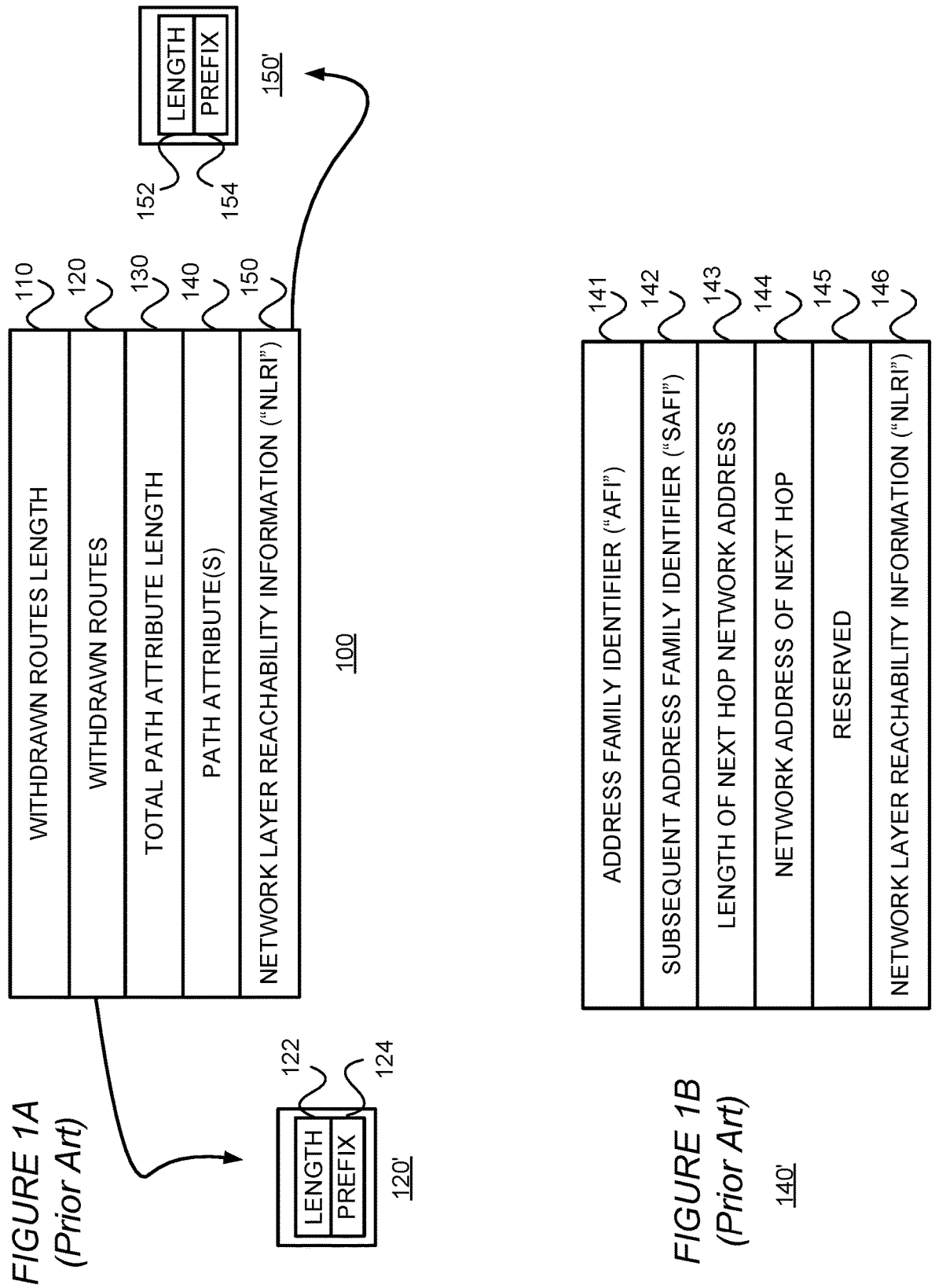
FIG. 1A illustrates a BGP update message and FIG. 1B illustrates a Mulitprotocol Reachable NLRI ("MP_Reach_NLRI") path attribute.
Figure 2:
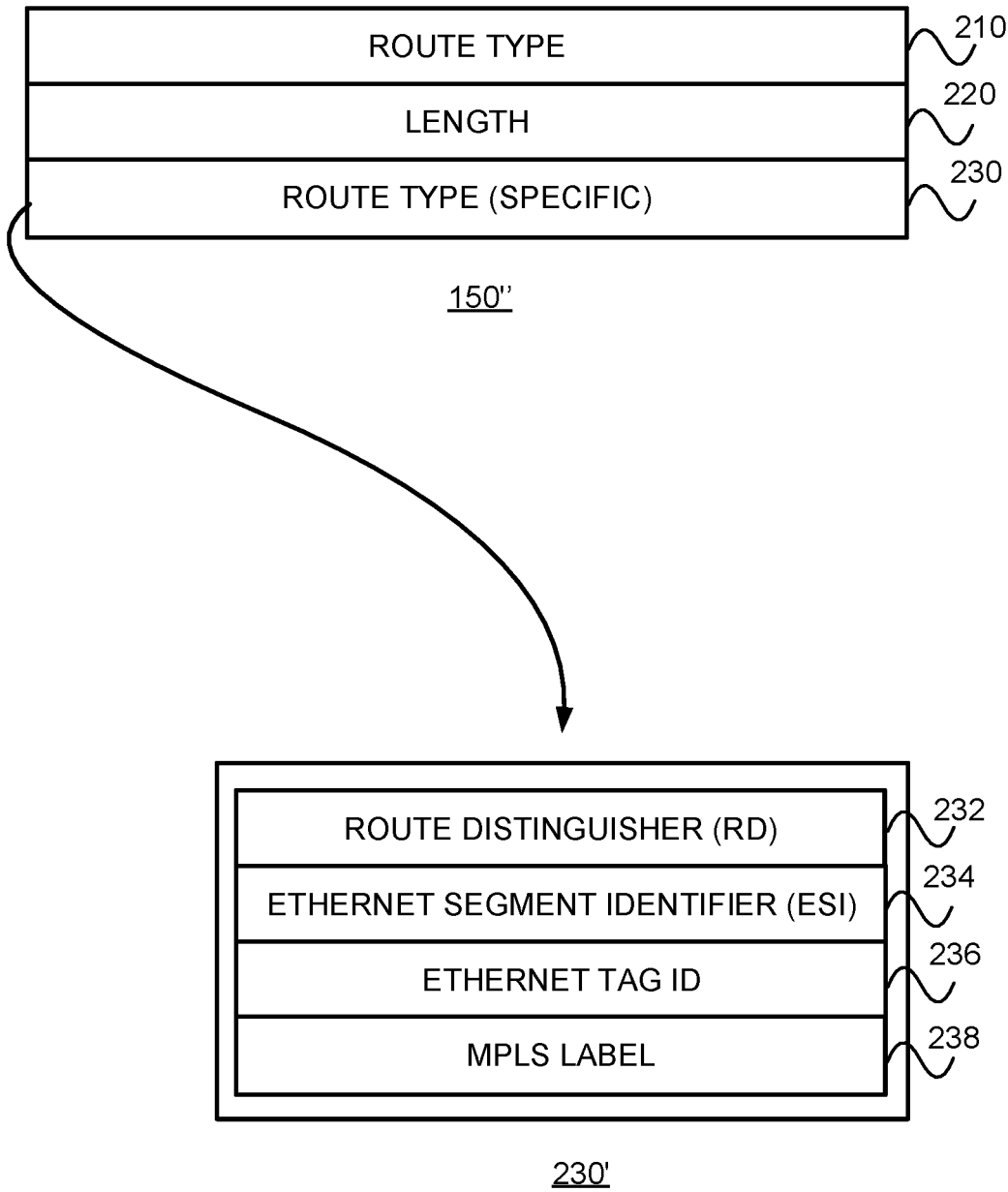
FIG. 2 illustrates EVPN BGP Network Layer Reachability Information (NLRI).
Figure 3:
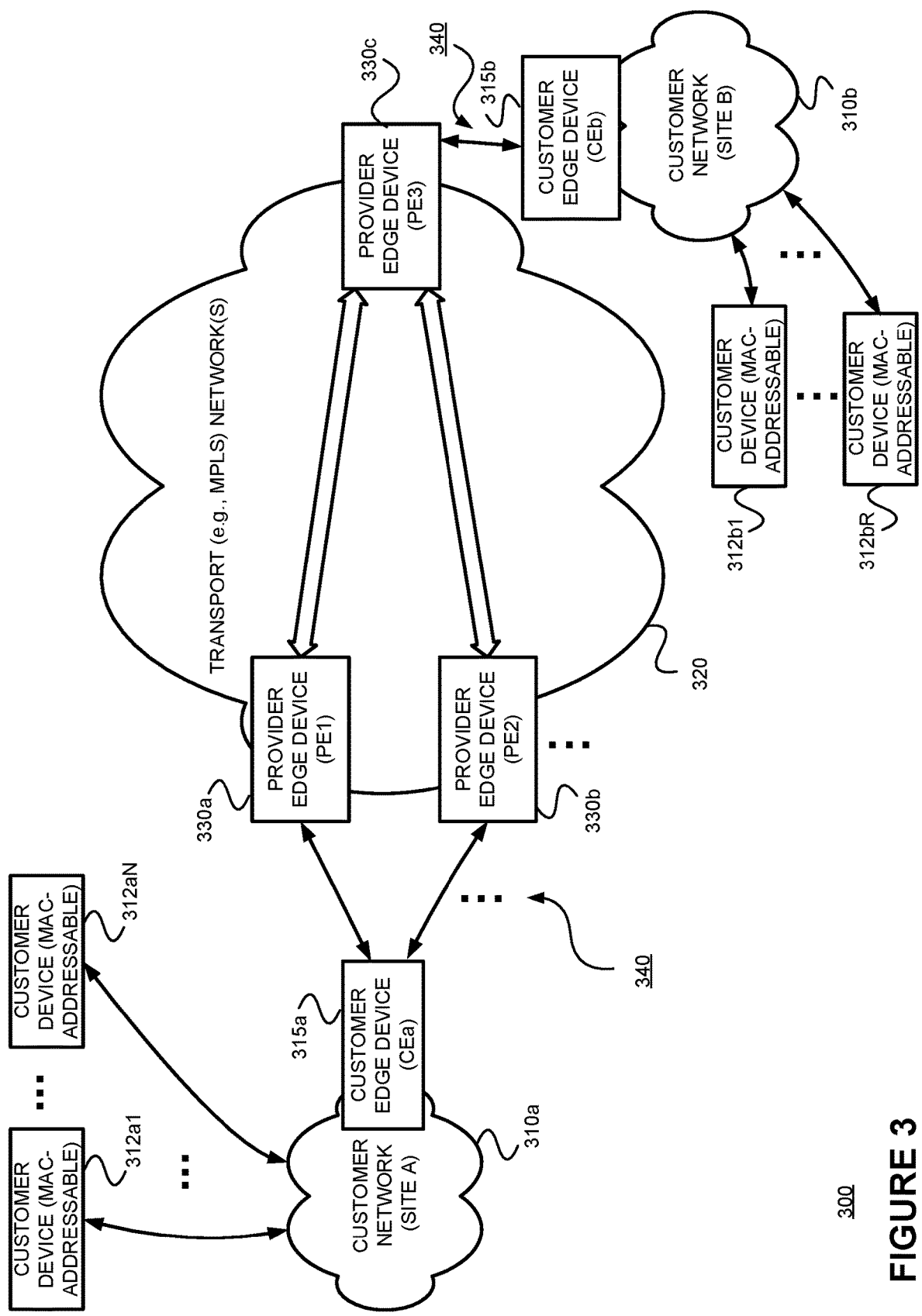
FIG. 3 illustrates an example EVPN environment in which example embodiments consistent with the present disclosure may be used, and which is used to illustrate certain operations of the present disclosure.

PEs and CEs may each represent a router, switch, or another suitable network device(s) that participates in a layer two (L2) virtual private network (VPN) (L2VPN) service, such as an EVPN. Customer networks may be networks for geographically or logically separated sites of an enterprise, or may represent networks for different customers of the service provider transport network (or tenants of a data center network). Each of customer devices (Recall, e.g., 312a1, 312aN, 312b1, 312bR of FIG. 3) may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of the example network 300 illustrated in FIG. 3 is merely an example. For example, an enterprise may include any number of customer networks. Nonetheless, for ease of description, only customer networks-sites A and B 310a and 310b are illustrated in FIG. 3.

The transport network may represent a service provider network that is owned and operated by a service provider, which is usually large telecommunications entity or corporation. The transport network may represent an L3 computer network. Although not illustrated, the transport network may be coupled to, or include, one or more networks administered by other providers, and may thus form part of a large-scale public network infrastructure, e.g., the Internet. Consequently, customer networks may be viewed as edge networks of the Internet. The transport network may provide computing devices within customer networks with access to the Internet, and may allow the computing devices within the customer networks to communicate with each other. In some cases, transport network may be considered to be (or include) an intermediate network representing a data center L2/L3 switching fabric (or "data center fabric network") that interconnects CEs for tenants of the data center, where a tenant may represent an organization or a logical partitioning of resources, data, and/or applications within the data center.

The transport network may include a variety of network devices other than PEs. For instance, the transport network may include one or more route reflectors, one or more provider routers (also known as "P," "transit," "intermediate," or "core" routers), switches, etc. In some examples, a route reflector (not shown) may reside within transport network and along a path between two or more PE routers.

Although some elements of the example network 300 are shown without intervening devices, it is possible that there are one or more intervening device(s) and/or link(s) between such elements.

The service provider transport network may provide an MPLS core or IP tunneling infrastructure for sending network packets from one customer network to another. PEs (and transport routers) that implement the MPLS protocol, apply one or more MPLS labels (commonly referred to as "a label stack") to network packets in accordance with routing and forwarding information configured at each respective PE. In an EVPN, a label stack applied to a network packet may include multiple labels. For instance, a label stack may include an outer label and an inner label. The outer label serves as a "transport label" that uniquely identifies a PE in an MPLS core. That is, each of PEs may exchange control plane messages at configuration and startup that specify an outer label that uniquely identifies each respective PE router. PEs may configure their respective forwarding units such that network packets that include the outer label corresponding to a particular PE are forwarded to that particular PE. The inner label, or "service label," of the MPLS label stack provides EVPN-specific configuration information. For example, EVPN may define Ethernet AD routes, MAC/IP advertisement routes, Ethernet Segment routes, etc.

§ 4.5 CONCLUSIONS

As should be appreciated from the foregoing description, example embodiments consistent with the present description improve aliasing under RFC 7432 by preventing (or at least reducing the probability of) dropped or flooded packets.

What is claimed is:

1. For use in an Ethernet Virtual Private Network (EVPN) in which a customer site including at least one MAC-addressable device is multihomed, via a customer edge device (CE), to at least two provider edge devices (PE1 and PE2), a computer-implemented method for controlling EVPN aliasing-based advertisements of an auto-discovery per EVPN instance (A-D/EVI) route or an auto-discovery per Ethernet segment identifier (A-D/ESI) route to a remote provider edge device (PE3), belonging to the EVPN but not directly connected with the CE, such that the probability of one of the at least two provider edge devices (PE2) dropping or flooding packets designed for a MAC-addressable device of the multihomed site is reduced, the computer-implemented method comprising:
   a) determining, by the one of the at least two provider edge devices (PE2), whether or not a MAC-learning condition is met; and
   b) responsive to a determination that the MAC-learning condition is met,
      performing EVPN aliasing-based advertising, by the one of the at least two provider edge devices (PE2), of an A-D/EVI route or an A-D/ESI route to the remote provide edge device (PE3), and
   otherwise, responsive to a determination that the MAC-learning condition is not met,
      suppressing, by the one of the at least two provider edge devices (PE2), an A-D/EVI route advertisement or an A-D/ESI route advertisement that would otherwise occur due to EVPN aliasing, such that the remote provider edge device (PE3) does not assume that the customer edge device (CE) is reachable via the one of the at least two provider edge devices (PE2).

2. The computer-implemented method of claim 1, wherein the MAC-learning condition is that the one of the at least two provider edge devices (PE2) has received all MAC advertisements from any other of the at least two provider edge devices belonging to the EVPN and directly connected to the same multihomed customer site via the CE.

3. The computer-implemented method of claim 1, wherein the MAC-learning condition is that a border gateway protocol (BGP) end of route information base (RIB) (EOR) message has been received from any other multihomed provider edge devices directed connected with the multihomed site and belonging to the EVPN.

4. The computer-implemented method of claim 1 wherein responsive to a determination that the MAC-learning condition is met,
  performing EVPN aliasing-based advertising, by the one of the at least two provider edge devices (PE2), of an A-D/EVI route to the remote provided edge device (PE3), and
  otherwise, responsive to a determination that the MAC-learning condition is not met,
  suppressing, by the one of the at least two provider edge devices (PE2), an A-D/EVI route advertisement that would otherwise occur due to EVPN aliasing, such that the remote provider edge device (PE3) does not assume that the customer edge device (CE) is reachable via the one of the at least two provider edge devices (PE2).

5. The computer implemented method of claim 4 wherein the MAC leaning condition is that both (1) the one of the at least two provider edge devices (PE2) has received all MAC advertisements from any other PEs belonging to the EVPN and directly connected to the same multihomed site, and (2) a predetermined time has elapsed since a link to the multihomed site has come up, wherein the predetermined time has been selected to be sufficient for local MAC address learning.

6. The computer-implemented method of claim 4 wherein the MAC learning condition is that a border gateway protocol (BGP) end of route information base (RIB) (EOR) message has been received from any other multihomed provider edge devices directed connected with the multihomed site and belonging to the EVPN.

7. The computer-implemented method of claim 4 wherein the MAC learning condition is that the one of the at least two provider edge devices (PE2) has ensured that all necessary MAC routes for the multihomed site have been programmed in its MAC table.

8. The computer-implemented method of claim 4 wherein the customer edge device (CE) is multihomed with the at least two provider edge devices (PE1 and PE2) via a link aggregation group (LAG).

9. The computer-implemented method of claim 1 wherein responsive to a determination that the MAC-learning condition is met,
  performing EVPN aliasing-based advertising, by the one of the at least two provider edge devices (PE2), of an A-D/ESI route to the remote provider edge device (PE3), and
  otherwise, responsive to a determination that the MAC-learning condition is not met,
  suppressing, by the one of the at least two provider edge devices (PE2), an A-D/ESI route advertisement that would otherwise occur due to EVPN aliasing, such that the remote provider edge device (PE3) does not assume that the customer edge device (CE) is reachable via the one of the at least two provider edge devices (PE2).

10. A non-transitory computer-readable storage medium having stored thereon, processor-executable instructions which, when executed by at least one processors, cause the at least one processor to perform a method for use in an Ethernet Virtual Private Network (EVPN) in which a customer site including at least one MAC-addressable device is multihomed, via a customer edge device (CE), to at least two provider edge devices (PE1 and PE2), a computer-implemented method for controlling EVPN aliasing-based advertisements of an auto-discovery per EVPN instance (A-D/EVI) route or an auto-discovery per Ethernet segment identifier (A-D/ESI) route to a remote provider edge device (PE3), belonging to the EVPN but not directly connected with the CE, such that the probability of one of the at least two provider edge devices (PE2) dropping or flooding packets designed for a MAC-addressable device of the multihomed site is reduced, the method comprising:
  a) determining, by the one of the at least two provider edge devices (PE2), whether or not a MAC-learning condition is met; and
  b) responsive to a determination that the MAC-learning condition is met,
    performing EVPN aliasing-based advertising, by the one of the at least two provider edge devices (PE2), of an A-D/EVI route or an A-D/ESI route to the remote provide edge device (PE3), and
  otherwise, responsive to a determination that the MAC-learning condition is not met,
    suppressing, by the one of the at least two provider edge devices (PE2), an A-D/EVI route advertisement or an A-D/ESI route advertisement that would otherwise occur due to EVPN aliasing, such that the remote provider edge device (PE3) does not assume that the customer edge device (CE) is reachable via the one of the at least two provider edge devices (PE2).

11. The non-transitory computer-readable storage medium of claim 10, wherein the MAC-learning condition is at least one of: (A) that the one of the at least two provider edge devices (PE2) has received all MAC advertisements from any other of the at least two provider edge devices belonging to the EVPN and directly connected to the same multihomed customer site via CE; and (B) that a border gateway protocol (BGP) end of route information base (RIB) (EOR) message has been received from any other multihomed provider edge devices directed connected with the multihomed site and belonging to the EVPN.

12. A provider edge device for use in an Ethernet Virtual Private Network (EVPN) in which a customer site including at least one MAC-addressable device is multihomed, via a customer edge device (CE), to the provider edge device and at least one other provider edge device, the provider edge device comprising:
  a) a forwarding component for forwarding data packets to and from the customer site; and
  b) a control component for controlling EVPN aliasing-based advertisements of an auto-discovery per EVPN instance (A-D/EVI) route or an auto-discovery per Ethernet segment identifier (A-D/ESI) route to a remote provider edge device (PE3), belonging to the EVPN but not directly connected with the CE, such that the probability of one of the at least two provider edge devices (PE2) dropping or flooding packets designed for a MAC-addressable device of the multihomed site is reduced, the control component being configured to:
    1) determine whether or not a MAC-learning condition is met; and
    2) responsive to a determination that the MAC-learning condition is met,
      perform EVPN aliasing-based advertising of an A-D/EVI route or an A-D/ESI route to the remote provide edge device (PE3), and
    otherwise, responsive to a determination that the MAC-learning condition is not met,
      suppress an A-D/EVI route advertisement or an A-D/ESI route advertisement that would otherwise occur due to EVPN aliasing, such that the remote provider edge device (PE3) does not assume that the customer edge device (CE) is reachable via the one of the at least two provider edge devices (PE2).

13. The provider edge device of claim 12 wherein the control component is configured to, responsive to a determination that the MAC-learning condition is met,
perform EVPN aliasing-based advertising of an A-D/EVI route to the remote provided edge device (PE3), and
otherwise, responsive to a determination that the MAC-learning condition is not met,
suppress an A-D/EVI route advertisement that would otherwise occur due to EVPN aliasing, such that the remote provider edge device (PE3) does not assume that the customer edge device (CE) is reachable via the one of the at least two provider edge devices (PE2).

14. The provider edge device of claim 13 wherein the MAC-learning condition is that the provider edge device has received all MAC advertisements from any other PEs belonging to the EVPN and directly connected to the same multihomed site.

15. The provider edge device of claim 13 wherein the MAC-learning condition is that a predetermined time has elapsed since a link to the multihomed site has come up, and wherein the predetermined time has been selected to be sufficient for local MAC address learning.

16. The provider edge device of claim 13 wherein the MAC leaning condition is that both (1) the provider edge device has received all MAC advertisements from any other PEs belonging to the EVPN and directly connected to the same multihomed site, and (2) a predetermined time has elapsed since a link to the multihomed site has come up, wherein the predetermined time has been selected to be sufficient for local MAC address learning.

17. The provider edge device of claim 13 wherein the MAC learning condition is that a border gateway protocol (BGP) end of route information base (RIB) (EOR) message has been received from any other multihomed provider edge devices directed connected with the multihomed site and belonging to the EVPN.

18. The provider edge device of claim 13 wherein the MAC learning condition is that the provider edge device has ensured that all necessary MAC routes for the multihomed site have been programmed in its MAC table.

19. The provider edge device of claim 13 wherein the customer edge device (CE) is multihomed with the provider edge device and the at least one other provider edge device via a link aggregation group (LAG).

20. The provider edge device of claim 12 wherein responsive to a determination that the MAC learning condition is met, the control component is configured to
perform EVPN aliasing-based advertising of an A-D/ESI route to the remote provider edge device (PE3), and
otherwise, responsive to a determination that the MAC-learning condition is not met,
suppress an A-D/ESI route advertisement that would otherwise occur due to EVPN aliasing, such that the remote provider edge device (PE3) does not assume that the customer edge device (CE) is reachable via the one of the at least two provider edge devices (PE2).

* * * * *